(12) United States Patent
Maher (10) Patent No.: US 11,280,759 B2
(45) Date of Patent: Mar. 22, 2022

(54) OPTICAL SYSTEM FOR CAPILLARY ELECTROPHORESIS

(71) Applicant: LIFE TECHNOLOGIES CORPORATION, Carlsbad, CA (US)

(72) Inventor: Kevin Maher, Woodside, CA (US)

( * ) Notice: Subject to any disclaimer, the term of this patent is extended or adjusted under 35 U.S.C. 154(b) by 354 days.

(21) Appl. No.: 15/124,013

(22) PCT Filed: Mar. 6, 2015

(86) PCT No.: PCT/US2015/019280
§ 371 (c)(1),
(2) Date: Sep. 6, 2016

(87) PCT Pub. No.: WO2015/134925
PCT Pub. Date: Sep. 11, 2015

(65) Prior Publication Data
US 2017/0016853 A1 Jan. 19, 2017

Related U.S. Application Data (60) Provisional application No. 61/949,914, filed on Mar. 7, 2014, provisional application No. 61/949,961, filed on Mar. 7, 2014.

(51) Int. Cl.
*G01N 27/447* (2006.01)
*G01N 21/64* (2006.01)

(52) U.S. Cl.
CPC ..... *G01N 27/44721* (2013.01); *G01N 21/645* (2013.01); *G01N 27/44791* (2013.01);
(Continued)

(58) Field of Classification Search
CPC ....... G01N 27/44721; G01N 27/44791; G01N 21/645; G01N 2201/062; G01N 2021/6417
See application file for complete search history.

(56) References Cited

U.S. PATENT DOCUMENTS

| 5,614,726 A | 3/1997 | Kaye et al. |
| 5,993,634 A | 11/1999 | Simpson et al. |

(Continued)

FOREIGN PATENT DOCUMENTS

| EP | 1467202 | 10/2004 |
| JP | 2002228586 A | 8/2002 |

(Continued)

OTHER PUBLICATIONS

Casado-Terrones, S. et al., "Simple Luminescence Detectors Using a Light-Emitting Diode or a Xe Lamp, Optical Fiber and Charge-Coupled Device, or Photomultiplier for Determining Proteins in Capillary Electrophoresis: A Critical Comparison", *Analytical Biochemistry*, vol. 365, Feb. 23, 2007, 82-90.

(Continued)

*Primary Examiner* — Bethany L Martin
(74) *Attorney, Agent, or Firm* — Thermo Fisher Scientific (57) ABSTRACT

A system for conducting a capillary electrophoresis assay includes a light source, an interface, and an illumination optical system. The light source is configured to provide a source beam of electromagnetic radiation. The interface is configured to receive a plurality of capillaries containing one or more target molecules or sequence of molecules. The illumination optical system is configured in use to produce a plurality of output beams from the source beam and to direct each of the output beams to corresponding capillary of the plurality of capillaries.

5 Claims, 8 Drawing Sheets

(52) U.S. Cl.
CPC .............. *G01N 2021/6417* (2013.01); *G01N 2021/6484* (2013.01); *G01N 2201/062* (2013.01)

(56) References Cited

U.S. PATENT DOCUMENTS

| | | | |
|---|---|---|---|
| 6,156,178 A | | 12/2000 | Mansfield et al. |
| 6,361,672 B1 * | | 3/2002 | Zhu ................ G01N 21/645 204/452 |
| 2002/0015147 A1 * | | 2/2002 | Maher .............. G01N 27/44721 356/139.1 |
| 2004/0200723 A1 | | 10/2004 | Sakai et al. |
| 2005/0000812 A1 | | 1/2005 | Couderc et al. |
| 2006/0176481 A1 * | | 8/2006 | Forest ............... G01N 21/6456 356/344 |
| 2007/0188750 A1 | | 8/2007 | Lundquist et al. |
| 2011/0000560 A1 * | | 1/2011 | Miller .............. B01L 3/502715 137/561 R |
| 2014/0049771 A1 * | | 2/2014 | Sadri ............... G01N 27/44721 356/51 |

FOREIGN PATENT DOCUMENTS

| | | |
|---|---|---|
| JP | 2002540401 A | 11/2002 |
| JP | 2004325436 A | 11/2004 |
| JP | 2009080070 A | 4/2009 |
| JP | 2009526997 A | 7/2009 |
| JP | 2010078559 A | 4/2010 |
| JP | 2011059134 A | 3/2011 |
| WO | WO-94/29712 | 6/1994 |
| WO | WO-0057170 A1 | 9/2000 |
| WO | WO-2006052682 A2 | 5/2006 |
| WO | WO-2007095235 A2 | 8/2007 |

OTHER PUBLICATIONS

PCT/US2015/019280, International Search Report and Written Opinion dated Jun. 5, 2015, 12 Pages.

* cited by examiner

OPTICAL SYSTEM FOR CAPILLARY ELECTROPHORESIS

CROSS-REFERENCE TO RELATED APPLICATIONS

This application is a U.S. National application filed under 35 U.S.C. § 371 of International Application No. PCT/US2015/019280, filed on Mar. 6, 2015, which claims the filing date benefit of U.S. Provisional Application No. 61/949,914, filed on Mar. 7, 2014 and 61/949,961, filed on Mar. 7, 2014, which disclosures are herein incorporated by reference in their entireties.

BACKGROUND OF THE INVENTION

Field of the Invention

The present invention relates generally to a systems, devices, and methods for performing multi-capillary electrophoresis or similar assays, tests, or experiments, and more specifically to optical systems, devices, and methods for performing multi-capillary capillary electrophoresis or similar assays, test, or experiments.

Description of the Related Art

Capillary electrophoresis devices generally provide certain major components that include, for example, a capillary channel or array of channels, a separation medium source for providing a medium that may flow through the capillaries (e.g., a polymer fluid), a sample injection mechanism, an optical detector system or component, electrodes for producing an electric field, an anode buffer source on one end of the capillaries, and a cathode buffer source on the other end of the capillaries. Capillary electrophoresis devices generally also provide various heating components and zones to regulate the temperature of many of the aforementioned components. Regulating the temperature of many of these components can improve quality of results.

Current capillary electrophoresis devices use multiple structures to house these components and connect or couple these structures together to provide a working capillary electrophoresis device. Using multiple structures has disadvantages. It is therefore desirable to provide a capillary electrophoresis apparatus with a reduced number of interconnected structures to reduce the number of necessary heating zones, reduce user handling of the structures, reduce likelihood of component failure, and reduce introduction of bubbles and other artifacts into the apparatus.

DETAILED DESCRIPTION OF THE DRAWINGS

As used herein, the term "radiant source" refers to a source of electromagnetic radiation, for example, a source of electromagnetic radiation that is within one or more of the visible, near infrared, infrared, and/or ultraviolet wavelength bands of the electromagnetic spectrum. As used herein, the term "light source" refers to a source of electromagnetic radiation comprising a spectrum comprising a peak or maximum output (e.g., power, energy, or intensity) that is within the visible band of the electromagnetic spectrum.

Figure 1:
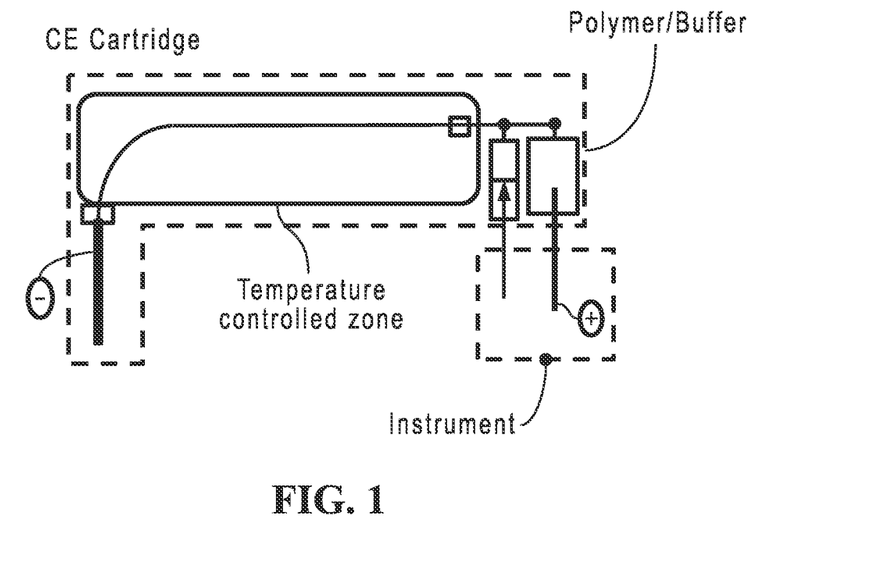

Referring to FIG. 1, in certain embodiments, a capillary assembly, holder, ribbon, cartridge, or the like comprises a capillary array, a cathode, an electrode sleeve, the polymer/buffer source, and polymer introduction mechanism (illustrated as a syringe pump). The cathode end of the capillaries may be provided outside the cartridge, for example, so that the cathode capillary ends can move from the sample (for loading of sample to capillary) to buffer (for insertion of the cathode end into the buffer).

Figure 2:
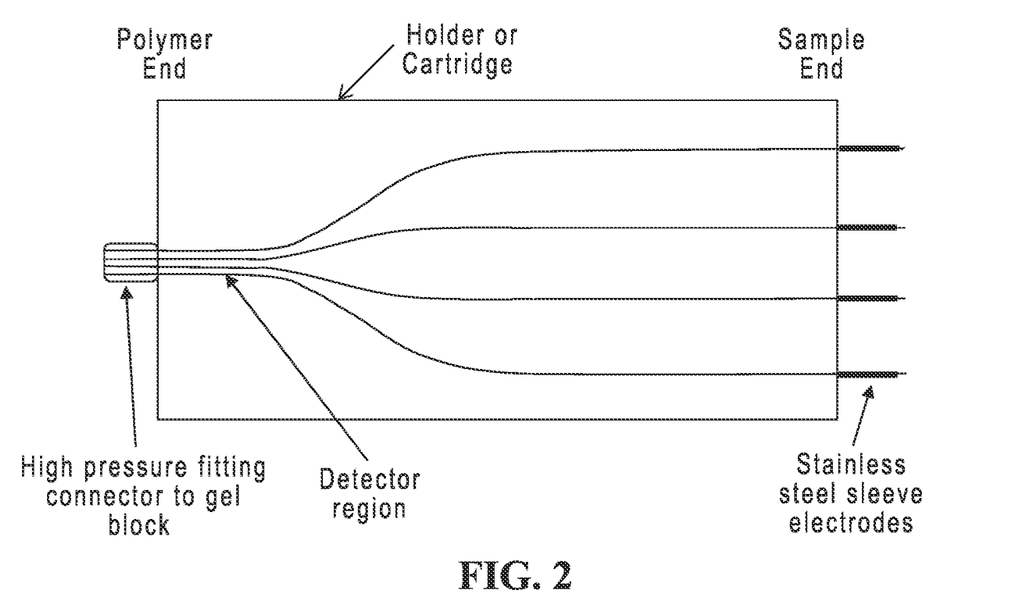
Figure 4:
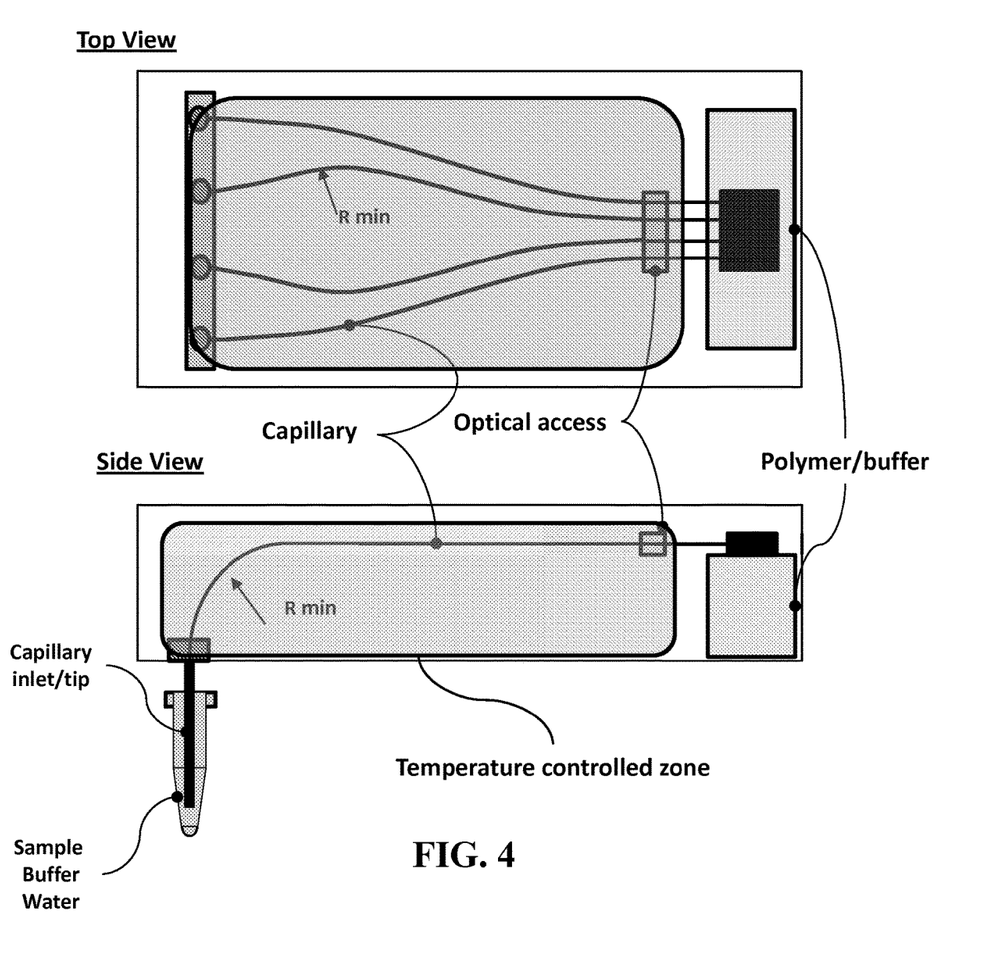

Referring to FIG. 2, a capillary array is located within a cartridge or holder in accordance with various embodiments of the present invention. The figure illustrates, by way of example, a 4-capillary array comprising a capillary array and a holder cartridge. In certain embodiments, the cartridge may include more than four capillaries, for example, 8, 10, 12, 16, or more capillaries, for example, to provide higher throughput or shorter assay runs. The cartridge or holder guides the shape of the individual capillaries in the array within the cartridge assembly such that injection ends, and a detector region and a high pressure polymer inlet are formed. As illustrated in FIG. 4, the capillaries may be spaced closer together over a detector region, for example, to provide efficient more efficient way of providing optical detection during a test, experiment, run, or assay.

Figure 3A:
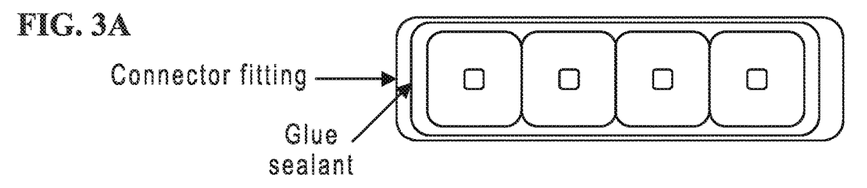
Figure 3B:
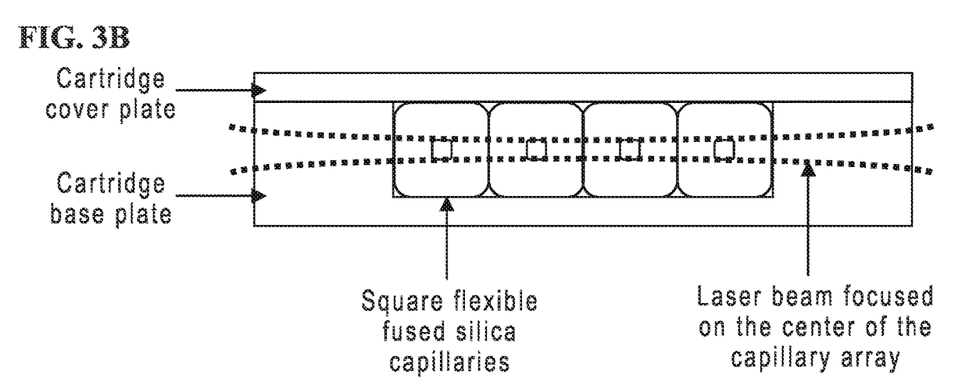
Figure 3C:
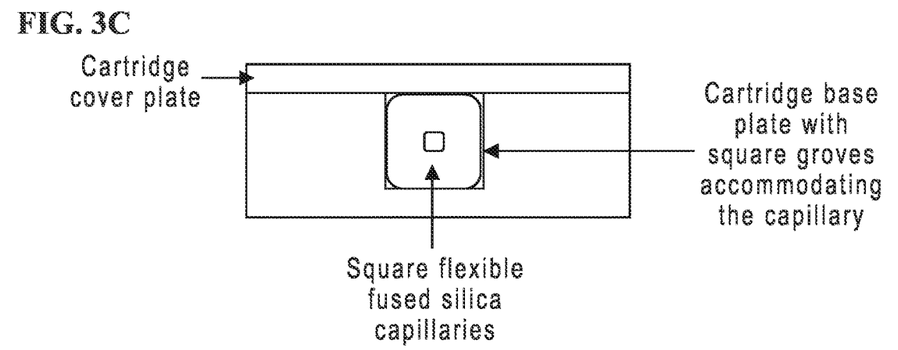

FIG. 3 depicts a capillary array in accordance with embodiments of the current invention. The capillary array comprises a plurality of square capillaries, for example, as plurality of square flexible fused silica capillaries that can be individually fitted with injection-needle. In certain embodiments, the square capillaries may be shaped stainless steel electrodes to perform electro-kinetic sample injection. As seen in FIG. 3B, the capillary array may be illuminated by a single beam of light or electromagnetic illumination, for example, provided by a laser beam. In such embodiment, optical data may be obtained by viewing the capillary array from the top or bottom of the figure. Advantageously, the square capillaries may be configured such that deviations in the illuminating beam cross-section as it passes through the square capillaries are less deviations produced by circular capillaries having the same refractive index and fluid contained within the capillaries.

Referring to FIG. 4, which depicts schematic interior view of horizontal capillary array, a cartridge may be provided in accordance with various embodiments to hold the capillary array and to interface with various other elements of a capillary system. The cartridge includes the capillary array and a polymer/buffer reservoir, where the polymer serves both as a polymer for the capillaries and an anode buffer. The cartridge also includes a single bend in the injection-to-detection region to allow access of the sample inlet/cathode end to sample for loading, capillary cleaner (e.g., water), and buffer for electrophoresis. The cartridge may be configured to provide temperature control of at least 80% of the capillary path. The cartridge also includes an optical access portion at a location where the capillaries are closer together and near the introduction of the polymer/buffer used during operation of the cartridge and associated system.

Further details of the construction and operation of the capillary array systems shown in FIGS. 1-4 are provided in the copending provisional patent application identifiable as Life Technologies (US Patent Application No. 61/949,961), which application is herein incorporated by reference in its entirety.

Figure 5:
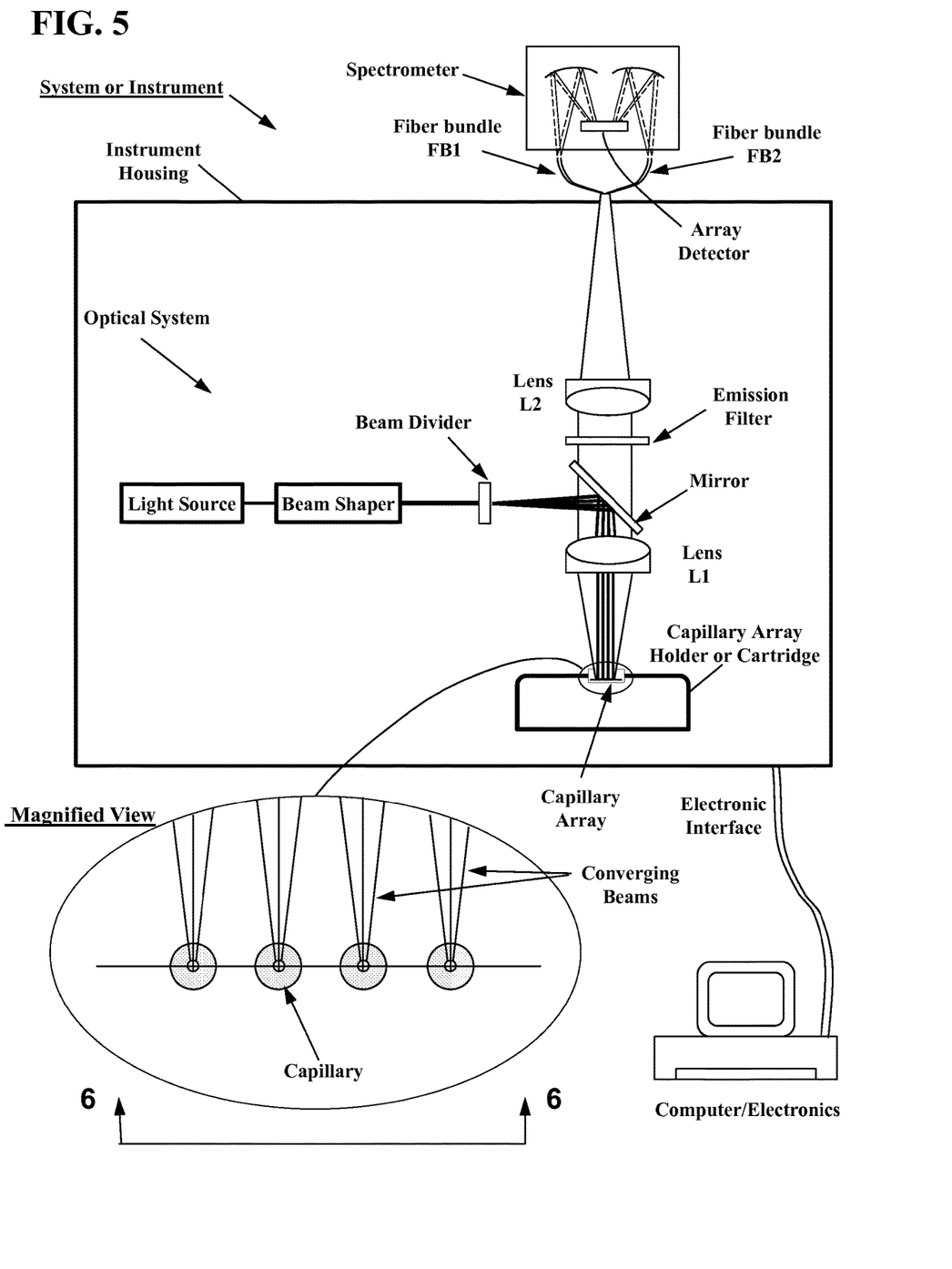

Referring to FIG. 5, certain embodiments of the present invention comprise a system or instrument for performing a capillary electrophoresis or similar assays, test, or experiment. The system comprises a capillary array that is contained, held, or housed within a capillary array holder, ribbon, cartridge, or the like. The capillary array comprises a plurality of capillaries or channels, for example, at least two capillaries or channels. In the illustrated embodiment, the capillary array comprises 4 capillaries or channels;

however, the array may include more than four capillaries, for example, 8, 10, 12, 16, or more capillaries, for example, to provide higher throughput or shorter assay runs.

The system in the illustrated embodiment shown in FIG. 5 also comprises an optical system that generally comprises a light source, a beam shaper, a beam divider, excitation and emission optical components, and a spectrometer system. The optical system may be configured in different embodiments for use with one or more types of capillary arrays, capillary holders, ribbons, cartridges, or the like, including, but not limited to the cartridges shown in FIGS. 1-3 or any of those disclosed in the Life Technologies' LT00897 PRO provisional application identified above. The system may also include an electronic interface such as an internal and/or external computer or processor. The external computer may be coupled to other portions of the system via a wired or wireless connection and/or via a network or cloud based system. The computer may be configured to operate one or more portions of the system, including but not limited to the light source, spectrometer, capillary array holder, chemical and/or electrical elements of the capillary array and related components, reagents, samples, or the like.

The light source by be a laser, light emitting diode (LED), LED array, xenon or halogen lamp, incandescent light source, or the like. In certain embodiments, the light source is a diode laser, for example, a diode laser having a wavelength of or about 505 nanometers. The light source may provide a single wavelength or wavelength range. Alternatively, the light source may be configured to provide more than one wavelength or wavelength range, either simultaneously or in a temporally sequential manner. For example, the light source may comprise a plurality of light sources having different wavelengths or wavelength ranges, or may comprise a broadband source including one or more optical or dichroic filters.

Light from the light source may pass through a beam conditioner or beam shaper to provide one or more predetermined optical characteristic including, but not limited to, a beam diameter(s), a beam shape (e.g., circular or elliptical), a predetermined intensity or power profile (e.g., constant, top hat, Gaussian, etc.). Additionally or alternatively, the beam conditioner may comprise a homogenizer, for example, configured to blend different color light sources and/or to provide a more even illumination cross-section of the output beam. In the illustrated embodiment, the beam shaper is configured to produce or provide a beam that has an elliptical cross section or shape. To produce or provide the elliptical shape, the beam shaper may comprise an anamorphic beam shaper. The anamorphic beam shaper may comprise one or more cylindrical lenses configured to produce a beam having an elliptical cross section, that is, in which the beam cross section is wider in one axis than in the other perpendicular axis. Alternatively, the beam shaper may comprise a Powel lens, for example, configured to provide a line focus and/or an elliptical beam cross section in which an intensity or power over a cross section of the beam uniform, or nearly uniform.

In addition, the beam shaper may be configured so that any diameter of the beam is greater than or less than the diameter of the beam entering the beam shaper. In the illustrated embodiment, the beam exiting the beam shaper is collimated. In certain embodiments, the beam entering the beam shaper is also collimated, while in other embodiments, the beam entering the beam shaper is not collimated, but is collimated by the beam shaper.

In the illustrated embodiment, the output from the beam shaper enters a beam divider configured to produce a plurality of identical or similar beams from a single input beam into the beam divider. As an example, the beam divider may comprise one or more diffractive optical elements, holographic optical elements, or the like, that is configured to produce or provide four elliptical beams for illuminating each of the four capillaries shown in FIG. 5. In the illustrated embodiment, the four beams have the same or a similar cross-section, and each beam diverges at a different angle relative to a system optical axis or general directions of light propagation. Alternatively, the beam divider may be configured to produce a plurality of beams that are parallel to one another or that converge relative to one another. In the illustrated embodiment, the beams out of the beam divider are collimated; however, some or all of the beams may alternatively be converging or diverging as they leave the beam divider.

The diverging beams from the beam divider in the illustrated embodiment are reflected by a mirror and directed toward the capillary array. Additional mirrors and/or diffractive elements may be included as desired to direct the four beams toward the capillary array, for example, to meet packaging constraints. The beams continue to diverge after reflection off the mirror until they are received by the lens L1 shown in FIG. 5. The mirror may be a dichroic mirror, or the like, which may be configured to reflect light at a predetermined wavelength or light over a predetermined wavelength range, while transmitting light or other electromagnetic radiation that is outside the predetermined wavelength or wavelength range. In some embodiments, the mirror is a dichroic mirror having more than one predetermined wavelength or wavelength range, for example, when the light source comprises more than one distinct wavelength or wavelength range. In the illustrated embodiment, the excitation beams are reflected by the mirror, while emitted light or radiation (e.g., fluorescent light or radiation) from the capillary array is transmitted or largely transmitted by the mirror. Alternatively, the location of the capillary array may be located along the optical axis of the beam divider and the mirror may be configured to transmit, or largely transmit, the excitation beams, while reflecting emitted light or radiation from the capillary array.

In the illustrated embodiment, the elliptical beams originating from the beam divider are each collimated as they enter the lens L1, but are diverging relative to one another. In such embodiments, the lens L1 may be configured focus each of the individual beam to a location at or near a respective capillary, as illustrated in the magnified view of FIG. 5. In addition, the lens L1 and the beams out of the beam divider may be configured such that the individual beams are each collimated relative to one another (e.g., the four beams in FIG. 5 may all travel parallel to one another after exiting the lens L1).

In certain embodiments, at least some of the capillaries include one or more fluorescent dyes, probes, markers, or the like, which may be selected to produce a fluorescent signal proportional to an amount of one or more target molecules or sequences of molecules present at a given time. The fluorescent signal(s), light, or radiation produced within any or all of the capillaries may be directed back through the lens L1 and the mirror so as to be received by a spectrometer.

After passing through the lens L1, the fluorescent radiation then propagates through one or more emission filters and a second lens L2 is used to re-image the radiation at an image plane. A detector, which may include an array detector such as a Charge-Coupled Device (CCD) or a Complementary Metal-Oxide Semiconductor (CMOS) detector, or the like, may be located at or near the image plane for further processing. In the illustrated embodiment, the radiation at the image plane is received by spectrometer, which may be configured to separate the signal created by different fluorescent dyes, probes, markers, for example, created by dyes, probes, markers corresponding to the DNA or RNA bases (e.g., adenine, thymine (or uracil), cytosine, and guanine).

The spectrometer may comprise a plurality of fibers, where each fiber may be associated with (e.g., receive radiation from) a corresponding one of the capillaries from the capillary array. Using the fibers, radiation from the capillaries is then transferred into the spectrometer, where it is dispersed by wavelength onto a detector (e.g., an array detector such as a CCD or CMOS detector or the like). In the illustrated embodiment, the plurality of fibers comprises two fiber bundles, FB1 and FB2, each bundle containing a plurality of fibers (two fibers each in the illustrated embodiment). The radiation from the fibers of FB1 enters on one side of the spectrometer and radiation from the other fibers in FBs enters on another side of the spectrometer. In this manner, the spectrum from each of the fibers (capillaries) is directed on a different portion of the detector. This configuration has been found to advantageously allow the spectrum from each of multiple capillaries to be produced and detected simultaneously on a single or reduced number of array detectors.

The emission filter located between lenses L1 and L2 may be configured block or attenuate light from the light source, thereby eliminating or reducing the about of light from the light source that is receive by the spectrometer. In certain embodiments, the focal length of lenses L1 and L2 are selected to produce a magnification of the capillaries or light from the capillaries that is different than one (e.g., to produce a magnified or demagnified image). For example, the lens L1 may be selected to have a numerical aperture (NA) that is twice the NA of the lens L2, resulting in a system magnification of two. In certain embodiments, lens L1 has an NA of 0.4 and lens L2 has an NA of 0.2. In some embodiments, the focal length or NA of lenses L1, L2 may be selected to (1) provide a focal spot, or focal point, at or near the capillary array that has a predetermined size or diameter and (2) simultaneously providing an NA that is matched to the NA of the spectrometer and/or the NA of the optical fiber system used to transfer light into the spectrometer.

As shown in FIG. 5, the entire optical system and cartridge may be located within a common instrument housing. The common housing may include an opening or port to allow transfer of radiation or light from the capillary array to the spectrometer. The spectrometer may be contained in a separate housing, as shown in FIG. 5, or included inside the same instrument housing as the optical system. In contrast to the embodiment shown in FIG. 5, the capillary array and/or some of associated hardware may be located outside the instrument housing, in which case an interface with the instrument may be provided via an opening or port in the instrument housing.

Figure 6:
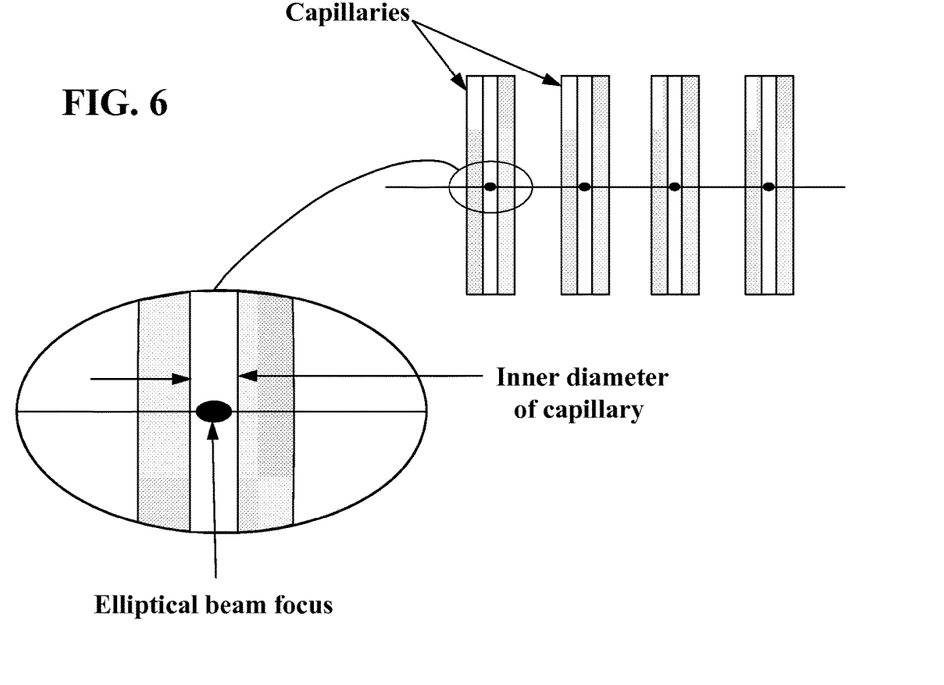
Figure 7:
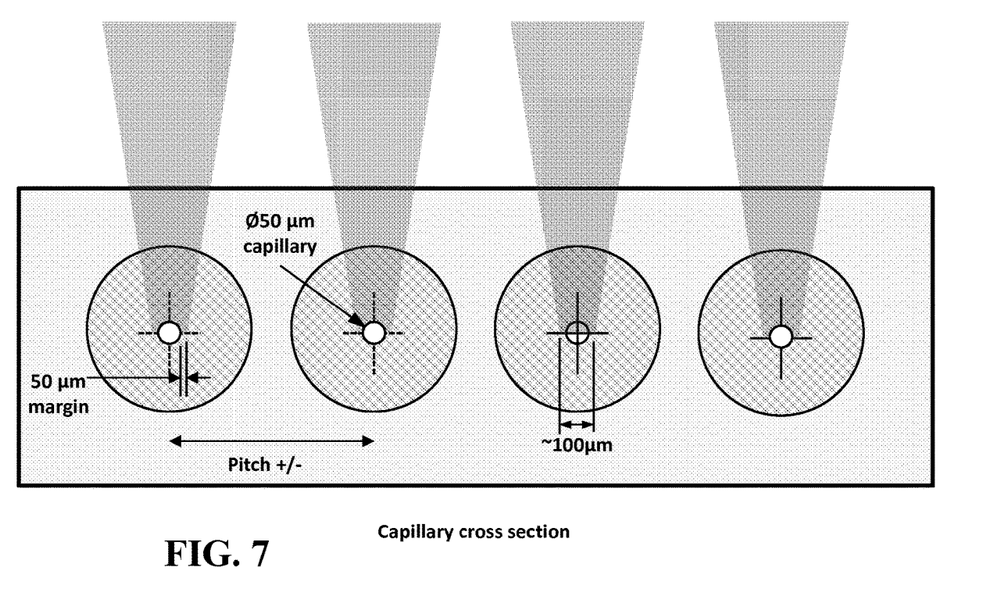

Referring to FIG. 6, the elliptical cross section of each of the beams may be oriented so that the long axis or dimension is oriented perpendicular or nearly perpendicular to an axis of the associated capillary. This orientation of the beam and focus has been found to advantageously reduce the sensitivity of the alignment of the capillary array to the beams. In the illustrated embodiment shown in FIG. 6, the long diameter of the beam focus is less than an inner diameter of an individual capillary. Alternatively, as illustrated in FIG. 7, the long diameter of the beam focus may be larger than the inner diameter of the individual capillary. FIG. 7 also illustrates the diameters and pitch of the capillaries within the array for certain embodiments. As seen in the illustrated embodiment, the inner diameter of the capillary is 50 micrometers, while the focused beam has a diameter of about 100 micrometers.

Figure 8:
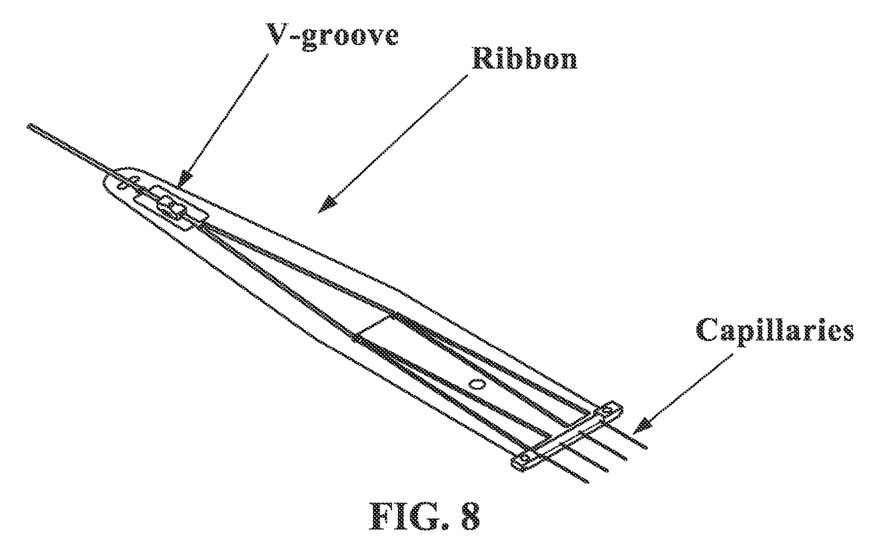
Figure 9:
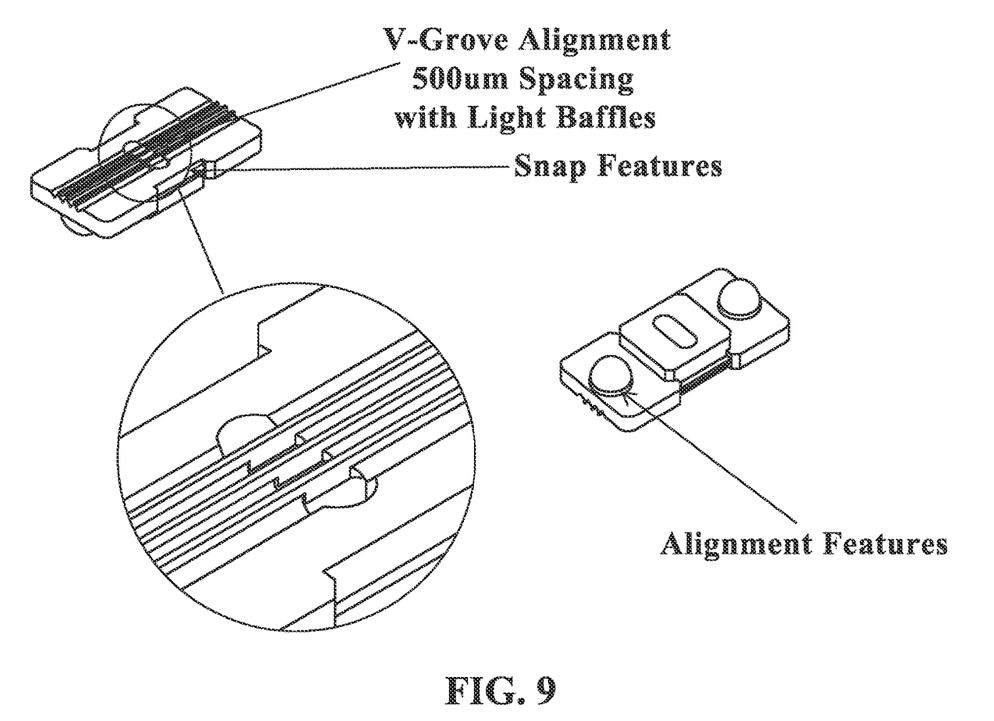

Referring to FIGS. 8 and 9, a ribbon configuration of the capillary array is illustrated, which may be used in certain embodiments of the instrument shown in FIG. 5. The ribbon may be configured to interface directly with the instrument or may alternatively be disposed within a carrier or cartridge that interfaces with and/or is coupled to the instrument. As shown in FIG. 9, the ribbon may comprise a V-groove block, fixture, or arrangement that is configured to receive the individual capillaries so as to provide a predetermined alignment and/or spacing between the capillaries of the array. A snap feature is shown that may be configured to help maintain the capillaries within the ribbon. The V-groove block may also comprise alignment tabs or similar features that are used to engage the instrument in a way that provides a known tolerance in the alignment of the capillaries with the associated light or radiation beams. For example, the tabs may be configured to provide a predetermined tolerance of the lateral position of the capillaries relative to the beams and/or a predetermined angular tolerance.

Figure 10A:
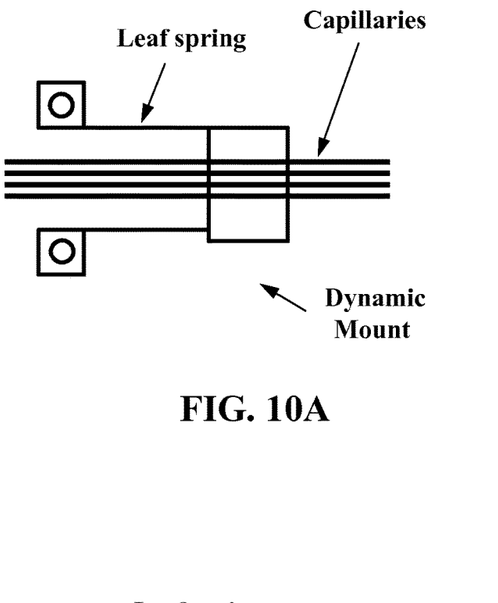
Figure 10B:
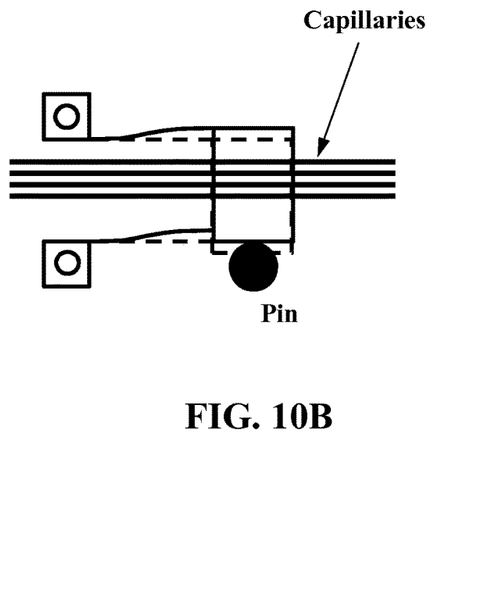
Figure 11A:
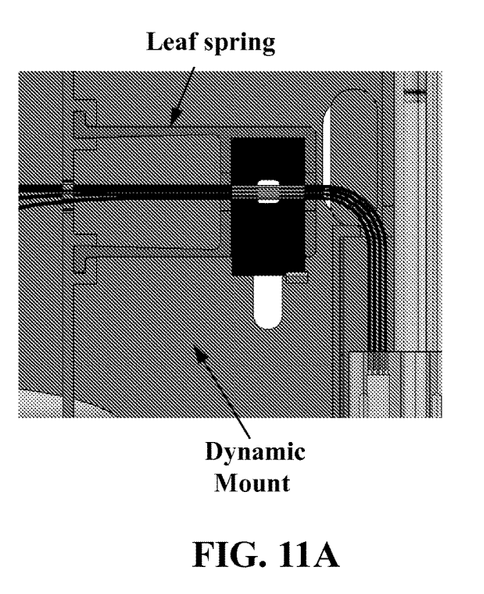
Figure 11B:
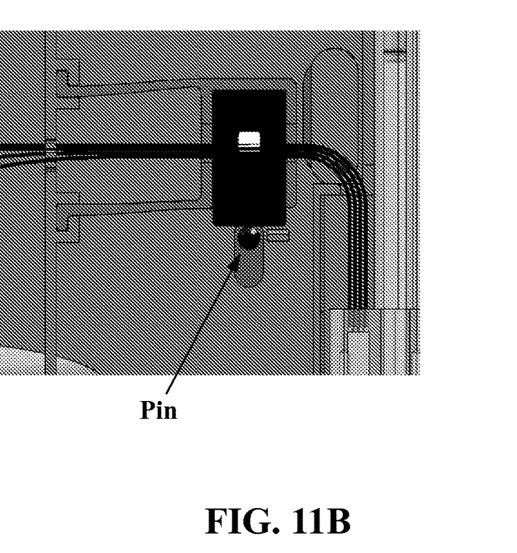

Referring to FIGS. 10A-B and FIGS. 11A-B, in certain embodiments, a capillary array holder or cartridge comprises a dynamic mount that generally constrains or restricts movement in all but one direction. A seen in the illustrated embodiment, the dynamic mount allows movement of the capillary array in a direction perpendicular to a length of the individual capillaries, while eliminating or restricting motion in other directions and/or eliminating or restricting angular positioning or motion of the capillary array. As shown in FIGS. 10B and 11B, the dynamic mount advantageously allows a pin of known location relative to the illuminating beams to move the capillary array into a predetermined position relative to the illuminating beams. Such a configuration may also be configured to reduce or eliminate twisting of the capillary array during an alignment process.

As opposed to the above passive alignment mechanisms described above, in certain embodiments, alignment of the capillaries and/or capillary array is accomplished using an active alignment. For example, a signal from one or more of the capillaries may be used to determine the degree of alignment between the illuminating beams and the capillaries. The signal produced during an alignment process or step may be used in conjunction with a movement mechanism that moves one or more of the capillary array, one or more individual capillaries, one or more illumination beams, the capillary cartridge, or some portion of a frame or support located within the instrument housing. A series of optical measurements may be made as relative motion is induced between one or more of the capillaries and one or more illuminating beams. In this manner, the degree of alignment may be determined and/or chosen based on a monitoring of the strength of one or more signals produced as the relative position between one or more of the capillaries and one or more of the illumination beams is changed. In certain embodiments, such an active alignment process can be accomplished by using a capillary wall scatter signature to find and/or peak a Raman spectrum produced by a medium (e.g., water).

In some embodiments, two or more of the illumination or excitation beams into the different capillaries shown in FIGS. 5-7 are independently produced using separate light or radiation sources for different illumination beams. Additionally or alternatively, the independently produced illumination or excitation beams into the capillaries may utilize different optical elements for each—for example, separate beam shapers, separate mirror, separate lenses, and the like. In such embodiments, a common light source may be utilized, but different split into different optical paths that each have their own separate optical and/or conditioning elements. In such embodiments, each separate illumination or excitation beam may utilize a passive or active process and/or hardware for aligning each beam to its respective capillary—for example, using one or more of the alignment devices or procedures discussed above. Such systems and methods advantageously allow greater flexibility in the design and construction of the capillaries and associated cartridge or holder.

Figure 12:
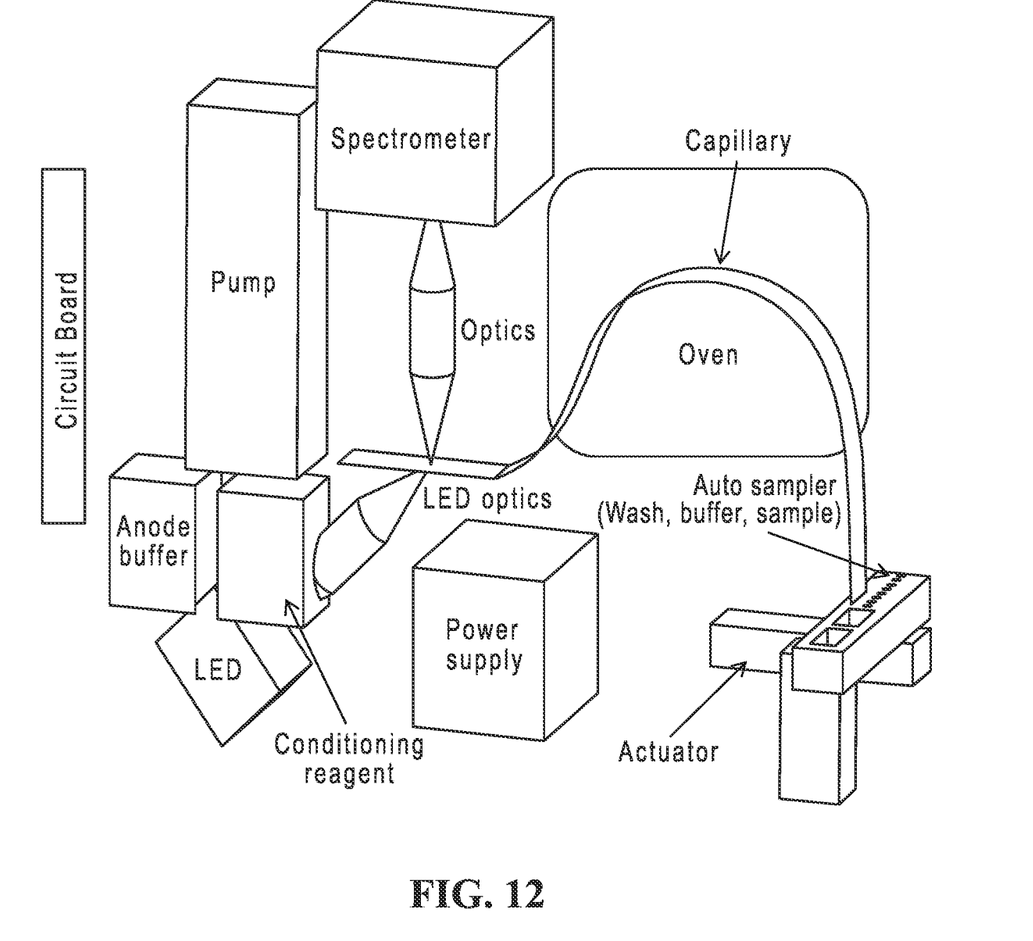

Referring to FIG. 12, in certain embodiments, the illumination and imaging optics are located along entirely different paths. In certain embodiments, the system in FIG. 12 comprises two or more capillaries and multiple LEDs or other light sources to produce plural illumination or excitation beams that illuminate corresponding capillaries of the two or more capillaries. Additionally or alternatively, each of the two or more capillaries may have its own spectrometer. Such systems advantageously allow greater flexibility in the design and construction of the capillaries and associated cartridge or holder.

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover modifications and alternate constructions coming within the spirit and scope of the invention as generally expressed by the following claims, which particularly point out and distinctly claim the subject matter of the invention.

What is claimed is:

1. A system for conducting a capillary electrophoresis assay, the system comprising:
   a capillary array comprising a plurality of capillaries configured for containing one or more target molecules or sequence of molecules;
   a light source configured to provide a source beam of electromagnetic radiation;
   a spectrometer comprising a plurality of fibers, wherein each fiber is associated with a corresponding one of the capillaries, and wherein radiation from the capillaries is dispersed by wavelength onto an array detector;
   an interface configured to receive the plurality of capillaries;
   an illumination optical system configured in use to produce a plurality of output beams from the source beam and to direct each of the output beams to a corresponding capillary of the plurality of capillaries, wherein each output beam is oriented perpendicular or nearly perpendicular to a longitudinally extending axis of the corresponding capillary;
   an emission optical system configured to produce a plurality of spectrum simultaneously at the detector, each spectrum corresponding to a respective capillary from the capillary array; and
   a capillary array holder comprising a dynamic mount configured to provide an active alignment of the plurality of capillaries by adjusting a relative position between the plurality of capillaries and the plurality of output beams based on a signal from one or more capillaries.

2. The system of claim 1, wherein the illumination optical system comprises at least one of a beam divider configured to produce the plurality of output beams, a diffractive optical element configured to produce the plurality of output beams, or a holographic optical element configured to produce the plurality of output beams.

3. The system of claim 1, wherein, during use, the system is configured to produce at least four output beams.

4. The system of claim 1, wherein, during use, the system is configured to produce a plurality of output beams and each of the plurality of output beams is characterized by an elliptical cross-section.

5. The system of claim 1, wherein, during use, the system is configured to produce a plurality of output beams and each of the plurality of output beams is parallel to the other output beams.

* * * * *